3,047,712
METHOD AND APPARATUS FOR WELDING STRIP-LIKE MATERIAL TO CURVED SURFACES

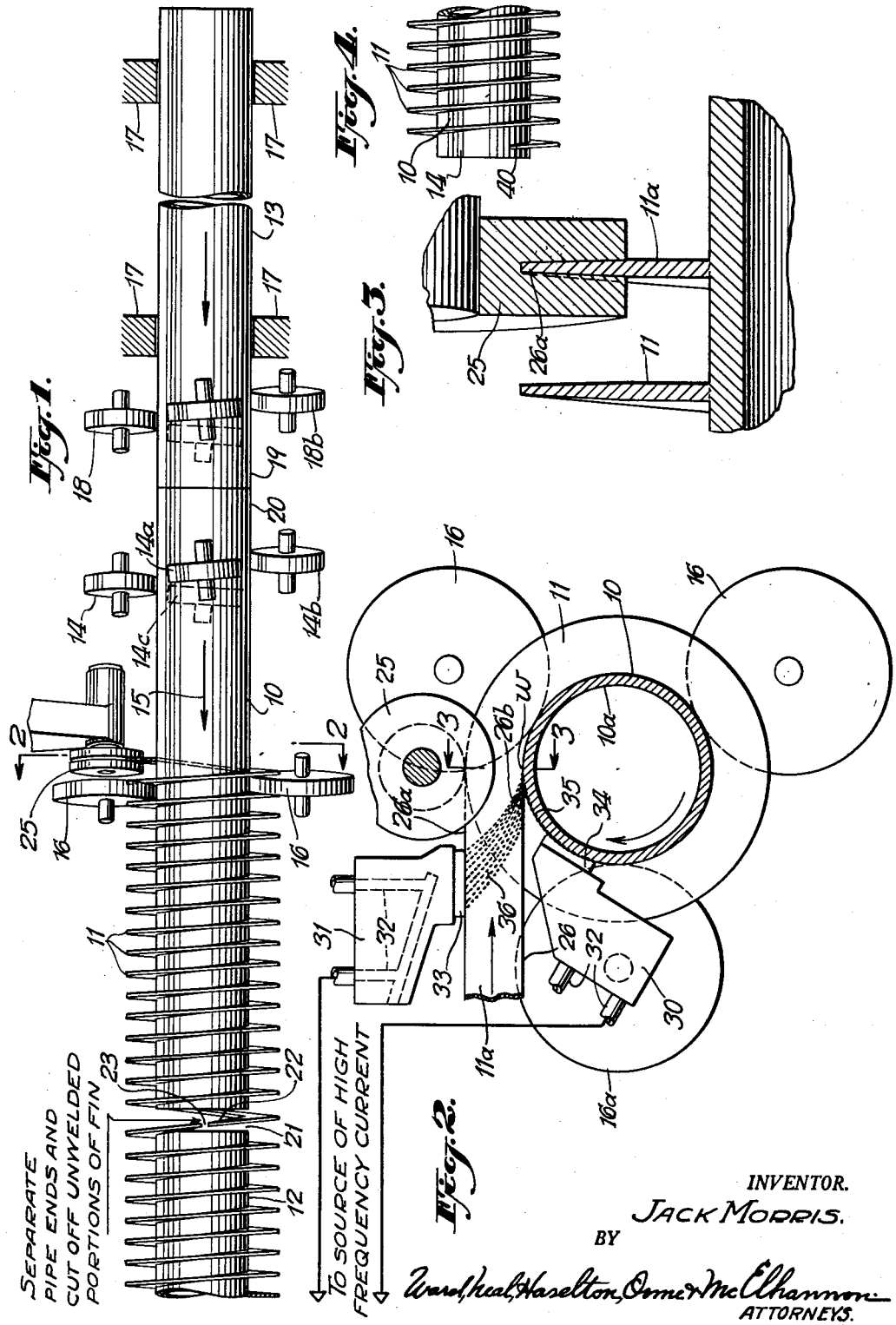

Jack Morris, Monsey, N.Y., assignor, by mesne assignments, to American Machine & Foundry Company, New York, N.Y., a corporation of New Jersey
Filed Feb. 23, 1961, Ser. No. 91,236
8 Claims. (Cl. 219—107)

This invention relates to the welding of rod or strip-like metal members to areas of other metal members having a substantially curved or receding surface. The invention is particularly adapted among other possible uses to the welding of strip material on edge to a metal member such as a tube, pipe or cylinder so that the strip material helically surrounds the other member to provide for example fin-like radiating means thereon.

The welding of metal strips on edge with respect to a curved surface on another metal member such as the exterior of a cylinder or tube has heretofore involved a serious difficulty which has not been heretofore satisfactorily overcome in cases where the strip has a substantial transverse dimension, that is, a relatively significant height, so that it tends to wrinkle or become otherwise objectionably distorted as it is pressed against the curved surface of the other member or wrapped around the latter.

In accordance with the present invention this difficulty is eliminated by performing the welding operation by using high frequency current of a frequency of the order of 50,000 cycles per second or higher and conductively applied in such manner that the same current concurrently causes heating of portions of the metal strip spaced from and opposite from the line of the weld, to a temperature such that these portions are readily stretched relative to the portions which are being welded, with the consequence that no part of the strip is wrinkled or distorted as it is bent and pressed into welded position with respect to the curved surface of the other member.

The invention also makes possible in a very economical way the provision of a strip or the like welded in place on a curved or receding surface area as above referred to, and which strip in case its cross section was normally rectangular, will have after being welded in place a cross section of tapered thickness, the thicker portions at its base being welded in place and the thinner portions being outermost. This makes possible a desirable construction for finned radiator tubing for example, in that for a given amount of metal the fin may be more rugged and securely welded in place leaving the outer portions of the thinner cross section desirable for efficient radiation.

In accordance with the invention the strip-like material is advanced longitudinally continuously into engagement generally tangentially with the curved surface of the other member while high frequency current is applied by contact means engaging respectively the strip material and the other member at points in advance of the point of tangency whereby heating current flows on the surfaces of the metal members respectively to and from such contacts to the point of tangency which is the point at which the two members become welded together along a desired line, such as a helical line on the surface of a cylindrical member as the latter is rotated and also advanced axially with respect to the position at which the strip material is applied thereto.

The United States patent to Rudd 2,873,353 discloses a method for helically forming and welding tubing by the use of high frequency current applied by contacts to the work. Reference to such patent is made as disclosing certain aspects of the general method of welding utilized in practising the present invention. With this general method of heating by the use of high frequency current conductively applied for the purposes of welding it has heretofore been the practice to apply the current at points close to the opposed edges which are to be welded whereby such edges will be most efficiently heated. However it has been found in accordance with the present invention that if the contact which is applied to the strip in which wrinkling is to be avoided, is located at a point on the side or edge of the strip remote from the line of the weld then a sufficient amount of the current if at the frequencies above specified, will flow on to such opposite edge and more or less diagonally along the surfaces of the strip to a region which is very shortly in advance of the weld point. In this way it has been found possible to not only heat to welding temperature the edge of the strip which is to be welded by the time it reaches the weld point, but also at the same time the regions more remote from the weld line on the strip and particularly the edge portion opposite the weld line may be heated to a temperature sufficient to facilitate the stretching or reshaping thereof without rupture and thereby avoiding the undesired wrinkling or similar distortions of the metal. Rollers may for example be applied to such annealed edge to give same a rounded or rounded corner shape, or a truncated or flared edge.

When a strip on edge is bent around a curved surface it will be appreciated that the edge portions thereof which are the more remote from such surface will be the most liable to incur stretching and breakage if at normal temperature. It has been found that the present invention is particularly well adapted for heating these outermost edge portions of the strip to temperatures higher than portions intermediate the outer portions and the base portions. This presumably results in part from the fact that with frequencies such as above specified the current tends to be more concentrated on the edge surfaces of a metal member which are the most remote from the center line of the member. Also since the outer edge portions of the strip are normally in contact with other metal only on one side (the other side being exposed to the atmosphere) there will be less possibility for heat to radiate away from such outer edge portions into any adjacent metal, than there will be for heat to radiate from surfaces of the mid portions of the strip into surrounding metal. And thus for this added reason the outer edge portions ordinarily will be heated to the desired higher degree than the mid portions of the strip. Accordingly such outer portions may be subjected to the greater stretching and thinning effect above referred to. On the other hand at the portions of the strip at the base where the same becomes welded to the other member, the metal need not be subjected to tension while being applied in place but may even be subject to some compression and will therefore remain thicker than the opposite or outer edge.

It will be understood that the elongated metal strip member or rod which is to be welded in place may not necessarily be of solid metal but may for example be hollow and in the form of tubing and it may initially be of cross-sectional shapes other than rectangular, but in any case the undesired wrinkling or uncontrolled distortion thereof will be avoided by the use of the invention. The term "elongated metal strip" as used herein and in the appended claims is intended to comprehend these possibilities. It will be further understood that the invention is not only applicable to welding of strips or the like to another member having a cylindrical or similarly curved surface but is also applicable in cases where such other member may be otherwise shaped so as to deviate or recede more or less progressively away from the longitudinal line of application of the strip.

Various further and more specific objects and advantages of the invention will appear in the description below taken in connection with the accompanying drawings illustrating by way of example a preferred form of the invention.

In the drawings:

FIG. 1 is a somewhat schematic side elevational view of an assembly of apparatus in accordance with the invention;

FIG. 2 is a vertical sectional view taken substantially along line 2—2 of FIG. 1;

FIG. 3 is a sectional view with parts broken away taken substantially along line 3—3 of FIG. 2; and FIG. 4 is an elevational view of an end portion of a section of finned tubing which has been made by use of the invention.

Referring to FIG. 1 in further detail, a length of pipe or tubing is indicated at 10 on which a heat transferring or radiating fin means 11 is being applied helically by utilizing the invention; a section of pipe is indicated at 12 on which such a fin has already been applied and another pipe section is indicated at 13 as it is entering the apparatus.

By the use of mechanism of various types the pipe or tube sections as at 10, 12, and 13 may be rotated while being longitudinally advanced with respect to the welding apparatus hereinafter described. As here shown, section 10 for example may be supported and advanced by the use of a plurality of skewed rollers as at 14, 14a, 14b, 14c arranged at arcuately spaced positions about the periphery of the pipe 10 and so positioned and urged as by spring pressure or otherwise against the surface of the pipe 10 as to engage such surface with sufficient firmness and friction to advance the pipe 10 longitudinally at a predetermined speed in the direction of the arrow indicated at 15 while at the same time rotating such pipe section around its longitudinal axis also at a predetermined speed. Pipe section 10 may be further guided and retained in its desired path as by a plurality of rollers as indicated at 16, 16a and 16b which engage at regions subsequent to the point of application of the helical fin thereto.

In order to operate the apparatus substantially continuously the pipe section 13 and similar sections following same may be advanced into the apparatus through guide means as at 17 which may comprise pluralities of rollers if desired followed by skewed rollers as at 18, 18a, 18b and 18c similar to the rollers 14 etc. which engage the pipe section 10. Rollers 18 etc. engage the section 13 firmly and act to rotate same preferably at the same speed as the speed of rotation of pipe section 10, but while tending to advance the section 13 at a speed slightly faster than the section 10 so that the forward end 19 of section 13 will constantly engage under pressure the trailing end 20 of section 10 and thus tend positively to push the latter through the welding apparatus hereinafter described. In practice the resistance of section 10 against movement as thus pressed forwardly by section 13 will result in both sections advancing at the same predetermined speed as soon as the apparatus assumes its normal operating conditions.

As indicated at the left hand portion of FIGURE 1, a pipe section 12 to which the fin material has already been applied may be advanced by any suitable means or manually to leave a space 21 between the forward end of section 10 and the trailing edge of section 12, this space being initially spanned by somewhat stretched portions 22 of the fin material which may then be severed as at 23 to disconnect the finned tube section 12 from the subsequent section 10. As hereinafter explained, near the forward and trailing ends of each of the pipe sections the fin material may be applied thereto but not actually welded over a distance of one or more turns of the fin. This will permit the pipe sections to be separated as at 21 and the fin material cut as at 23 thereafter. As much as desired of the unwelded end turns of the fin material may then be cut away to thereby leave the ends of the pipe sections exposed for attachment of nipples or other conduit portions by threading, welding, force fitting or otherwise.

Referring now more particularly to FIG. 2, the ribbon-like stock or strip 11a which is to form the helical fin 11 is being pulled so as to advance to the weld point indicated at w and preferably in a position so that its vertical and generally greater cross-sectional dimension extends along close to a plane perpendicular to the axis of the pipe section 10. This strip or ribbon 11a may be guided and pressed firmly into position with respect to the weld point as by one or more suitably grooved pressure applying guide rolls, as at 25.

In order to start the apparatus in operation, an end of the strip or ribbon 11a may be suitably spot welded or otherwise affixed in a known way to a point on the surface of one of the pipe sections 10 so that thereafter as the pipe section is rotated and advanced it will serve to continuously pull successive portions of the strip 11a into position so that its lower edge 26 will tangentially engage the pipe section at the weld point w and become welded thereto as hereinafter explained. Meanwhile the upper edge 26a of the strip will be engaged by the pressure guide roller 25 substantially in the manner indicated in FIG. 3.

In accordance with the invention the strip 11a is welded to the pipe sections in the following way. Electrodes or contacts as at 30, 31 are provided, these being connected respectively to the terminals of a source of high frequency current, the frequency being of the order of 50,000 cycles per second or preferably considerably higher, for example 350,000 to 450,000 cycles per second. These electrodes may be suitably fluid cooled as by fluid circulating conduits or cavities therein as indicated at 32 and they may also be provided with high temperature and wear resistant shoe portions as at 33, 34. The electrode 30 is mounted in a position so that its shoe 34 will engage the pipe section at a point substantially in advance of the weld point w whereas the electrode 31 is mounted so that its contact shoe will engage the upper edge portion 26a of the strip 11a. Consequently the current from the high frequency source will flow along paths extending from the shoe 34 circumferentially as at 35 of the surface of the pipe section to the weld point and thence back along the lower edge 26 of the strip 11a for a short distance, and thence diagonally along a current path portion 36 to the contact shoe 33. Sufficient current is used whereby such high frequency current will cause the lower edge surface 26 and the upper surface of the pipe section to become heated to welding temperature at the weld point w. Also sufficient current is used whereby at the same time the current on the upper portions of the strip 11a will heat and anneal such portions but not to a temperature as high as the welding temperature of the metal. Only the surface portions which come into contact at the weld point w will ordinarily be heated to welding temperature, for example to a depth in the metal of a thousandths of an inch more or less, and leaving the metal at greater depths in firm condition so that it will forcefully "back up" the surfaces which are to be welded and permit them to be welded together with a uniform forged weld, suitable pressure being applied to the pressure roller or rollers at that region to insure such result.

At the same time in accordance with the invention, since the upper edge portions of the strip 11a are annealed or somewhat softened as same reach the region of the pressure roller 25, some substantial stretching thereof will occur enabling the strip, though it may have a quite significant vertical dimension, to be curved around in conformity with the curvature of the pipe section 10 (or other element having a curved surface and to which the strip is to be welded). This not only avoids wrinkling or distortion of the metal of the strip which otherwise would occur, in its passing around the curvatures, but also as indicated in FIG. 3 results in some reduction in the thickness of the outer portions of the fin means at the regions near where it engages within the groove of the pressure roller 25. This is desirable and advantageous because the cross section of the outer portions of the fin material for highest radiation efficiency need not be as massive as is preferable for the base portions which are secured by welding in position.

It may be noted that the portions of the strip 11a intermediate the upper and lower edges thereof will ordinarily in accordance with the invention, become heated only to a temperature somewhat below that to which the upper portions of the strip are heated and also of course very much below the temperature of welding to which the lower edge surface of the strip is heated. This is because the current of the high frequency ranges above noted, flowing along lines 36 (FIG. 2) largely on the surface of the strip will result in effectively heating the intermediate portions of the strip to some degree, but a considerable part of the heat will be conducted into the adjacent body of the metal. On the other hand the current flowing at the upper edge of the strip 11a will, because of the induction and "skin" effects occurring with such high frequency current and because such upper edge is exposed to the atmosphere (instead of being surrounded with other metal of the body of the strip) result in heating to a higher temperature than the intermediate portion of the strip and thereby cause annealing of such upper portions. The lower edge of the strip as at 26b however will be heated at its very surface portion to fusion or welding temperature at the time that same reaches the weld point. This is because of the intense mutual induction effects occurring between the high frequency current as flowing on opposite sides of the narrowing cap as the weld point is approached. The mutual inductance effect under these conditions, results in an intense concentration of the current on the surfaces as they approach the weld point. Incidentally, it should be noted that for convenience the location of the welding is referred to herein as the "weld point" but actually welding will occur along a short line transverse to the lower edge of the strip.

It is further noted that ordinarily there will be sufficient metal embodied in the pipe section 10 or other curved element to which the strip is to be welded so that some considerable portion of the heat caused by the high frequency current along line 35 will be conducted away. For that reason the electrode 30 with its shoe 34 should be positioned at a sufficient distance in advance of the weld point to insure a path of heating 35 of such sufficient length that welding temperature will be reached at the weld point, and this path will ordinarily be somewhat longer than the path of heating at 26b on the lower edge of the strip. This is because a lesser amount of heat will usually be conducted away from the surface to be welded on the strip, since the cross-section of the strip will usually embody a lesser mass of metal than the adjacent cross-sectional portions of the pipe 10 or the equivalent. Normally the path 26b on the lower edge of the strip will be shorter than the current path 35 by reason of the fact that the current diverges upwardly from such edge as indicated at 36.

The invention is well adapted for use in the application of helical fin strips or the like to pipes or other curved surfaces whether the parts are made of steel, aluminum, copper or other metals or alloys thereof. In a typical instance a steel strip material having a vertical dimension of ½" and a thickness of 1/16" for example may be welded to a pipe 4" in diameter and having a wall thickness of ⅛" and the welding may be accomplished at a rate of from 90 feet per minute up to 200 feet per minute (as measured along the helical line of the strip) by using for example a source of high frequency power from 40 kilowatts up to 140 kilowatts. In such cases where the work pieces are formed of steel, the upper edge portions of the strip may be heated to a temperature in the neighborhood of 1350° F. and in case the work is of aluminum, to a temperature of 700° to 900° F. Generally speaking, if the upper edge is heated to redness, it will become sufficiently annealed so that it may be stretched to the extent necessary to avoid its becoming distorted sideways or wrinkled as it passes around the curvature into welded position. Sometimes to avoid underheating it may be preferable to use sufficient high frequency current so that normally the strip portions would be overheated, and to prevent that a stream of water or soluble oil of predetermined temperature may be applied to the parts at the welding region.

In the operation of the apparatus, as the trailing end of one of the sections of the pipe 10 or the like reaches a region somewhat in advance of the weld point the operator may shut off the high frequency current source in any suitable known manner so that the heating and welding will be discontinued for a short period while such trailing edge and the forward edge of the succeeding section pass the weld point. Thus, one or more turns of the strip will continue to be applied into position for welding at the region of the ends of the sections, but will not actually be welded thereto. Thus the sections may readily be separated as indicated at the left hand portion of FIG. 1. Thereafter the unwelded portion of the strip may be cut away, for example back to the point indicated at 40 in FIG. 4, leaving end portions as at 41 of the pipe section exposed for ready attachment to some other conduit portion or the like as desired. In this way pipe sections may be successively advanced through the apparatus for welding the helical strip thereon in place continuously with one section immediately following another without interruption of the operation of the mechanical parts of the equipment.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method of controlling the shape of an advancing metal strip while applying, bending and welding same on an edge thereof to an advancing metal surface which veers away from the direction of advance of the strip in approaching said surface, which method comprises applying the terminals of a source of high frequency current respectively to the strip and to said surface at points thereon in advance of the point of application of the strip to the surface, for heating the said edge and the opposed portion of said surface to welding temperature at a welding point where same come into contact, said current as applied to the strip being applied at the edge portion thereof opposite from its said first mentioned edge whereby the current flows from such opposite edge across on the surface of the strip to said first-mentioned edge thence along the latter to the weld point and thence from the weld point along on said metal surface portion to the other terminal of the current source, said current being of a frequency of the order of 50,000 cycles per second or higher and sufficient to heat and anneal portions of the strip along its said opposite edge, to a degree whereby said portions are readily stretched substantially and the shape thereof controlled during such bending thereof.

2. Method of avoiding wrinkle-like distortions of an advancing metal strip while applying, bending and welding same on an edge thereof along a helical path on the surface of a generally cylindrical metal member as the latter is rotated about its axis, which method comprises applying the terminals of a source of high frequency current respectively to the strip and to said metal member at points thereon in advance of the point of application of the strip to said member for heating the said edge and the opposed portion of said surface of the member to welding temperature at the welding point where same come into contact, said current as applied to the strip being applied at the edge portion thereof opposite from its said first mentioned edge whereby the current flows from such opposite edge across on the surface of the strip to said first mentioned edge thence along the latter to the weld point and thence from the weld point along on the surface of the metal member to the other terminal of the current source, said current being of a frequency of the order of 50,000 cycles per second or higher and sufficient to heat and anneal portions of the strip along its said opposite edge, to a degree whereby such annealed portions are readily stretched substantially during bending of the strip to helical form.

3. Method in accordance with the foregoing claim 2 and in which two or more of the cylindrical members are longitudinally advanced end-to-end successively past the welding point while the strip is being continuously bent on edge to extend helically about said members, the said source of current being interrupted during the period when ends of said metal members are passing the weld point, whereby portions of the strip adjacent said ends will not be welded to the latter.

4. Method of avoiding wrinkle-like distortions of an advancing metal strip while bending same edgewise and welding same on an edge thereof to another metal member, which method comprises applying the terminals of a high frequency current respectivly to the strip and to said member at points thereon in advance of the point of application of the strip to the member, for heating the said edge and an opposed portion of said member to welding temperature at the welding point where same come into contact, said current as applied to the strip being applied to the edge thereof opposite from its said first mentioned edge whereby the current flows from such opposite edge across on the surface of the strip to said first mentioned edge thence along the latter to the weld point and thence from the weld point along the surface of said member to the other terminal of the current source, said current being of a frequency of the order of 50,000 cycles per second or higher and sufficient to heat and anneal portions of the strip along its said opposite edge, to a degree whereby such annealed portions are readily stretched to accommodate such bending without substantial wrinkling as compared with portions along said first main edge of the strip.

5. Method in accordance with the foregoing claim 4 and in which the frequency of said current is sufficiently high whereby said opposite portions of the strip are heated to a temperature higher than the portions thereof intermediate its edges but to a temperature below welding temperature.

6. Apparatus for bending and welding a metal strip helically on edge about an elongated generally cylindrical metal member which comprises means for supporting and rotating said member while advancing same longitudinally relative to a welding point, means for guiding the strip on edge whereby an edge thereof advances generally tangentially into engagement with said member at the welding point, a source of current of a frequency of the order of 50,000 cycles per second or higher, an electrode connected to one terminal of said source and mounted to engage the rotating member at a point thereon in advance of the welding point, another electrode connected to the other terminal of said source and mounted in a position to engage the strip substantially in advance of the welding point and at the edge portion of said strip opposite from said first mentioned edge thereof, a high frequency current path thereby being provided from said opposite edge across the strip to the edge thereof to be welded, thence along the latter edge to the welding point and thence over the surface of the cylindrical member to the electrode which engages the latter, said source being adapted to supply sufficient current at said frequencies to heat said opposite edge portions of the strip to an annealing temperature such that the annealed portions are readily stretched to accommodate the bending thereof about said cylindrical member without substantial wrinkling.

7. Apparatus for bending and welding a metal strip helically on edge about an elongated generally cylindrical metal member, comprising a plurality of rollers for engaging under pressure said member at spaced points about the circumference thereof, at least one of said rollers being driven, and said rollers being mounted on axes extending generally along in spaced relation to the axis of said member but skewed in respect thereto in a direction to cause said rollers to longitudinally advance the member past a welding point while rotating the member about its axis, roller means for guiding the strip on edge in a position whereby an edge thereof advances generally tangentially into pressure engagement with said member at the welding point, said member as rotated and with portions of the strip welded thereto being adapted to pull the strip into such tangential engagement, a source of current of a frequency of the order of 50,000 cycles per second or higher, an electrode connected to one terminal of said source, and mounted to engage the rotating member at a point on the circumference thereof in advance of the welding point, another electrode connected to the other terminal of said source and mounted in a position to engage the strip substantially in advance of the welding point and at the edge portion of the strip opposite from said first mentioned edge thereof, said source being adapted to supply sufficient current at said frequencies to heat said opposite edge portions of the strip to an annealing temperature permitting the bending thereof about the cylindrical member without substantial stretching, while heating said first mentioned edge and portions opposed thereto on said cylindrical member to welding temperature.

8. Apparatus in accordance with the foregoing claim 7 and in which means are provided for advancing a succession of the generally cylindrical members in end-to-end relation past the welding point and which means includes another plurality of such skewed rollers at least one of which is driven at a speed sufficient to urge the advancing forward end of a cylindrical member into engagement under pressure with the rear end of the cylindrical member which is then passing the welding point.

References Cited in the file of this patent

UNITED STATES PATENTS

| | | |
|---|---|---|
| 2,107,831 | Morseth | Feb. 8, 1938 |
| 2,376,762 | Ferguson | May 22, 1945 |
| 2,821,619 | Rudd | Jan. 28, 1958 |